United States Patent
Meincke et al.

(10) Patent No.: US 7,384,544 B2
(45) Date of Patent: Jun. 10, 2008

(54) CANISTER FILTER FOR SWIMMING POOL

(76) Inventors: Jonathan E. Meincke, 1101
Sparkleberry La. Ext., Columbia, SC
(US) 29223; Fred Brindisi, 1101
Sparkleberry La. Ext., Columbia, SC
(US) 29223

( * ) Notice: Subject to any disclaimer, the term of this patent is extended or adjusted under 35 U.S.C. 154(b) by 344 days.

(21) Appl. No.: 11/215,460

(22) Filed: Aug. 30, 2005

(65) Prior Publication Data
US 2007/0045163 A1    Mar. 1, 2007

(51) Int. Cl.
*E04H 4/12* (2006.01)
*B01D 29/27* (2006.01)
*B01D 35/14* (2006.01)

(52) U.S. Cl. .............. 210/167.12; 210/416.2; 4/507

(58) Field of Classification Search ........... 210/167.01, 210/167.1, 167.12, 167.14, 167.15, 416.1, 210/416.2, 436, 448; 4/507
See application file for complete search history.

(56) References Cited

U.S. PATENT DOCUMENTS

| | | | |
|---|---|---|---|
| 2,851,164 A * | 9/1958 | Morino ................ 210/433.1 |
| 3,297,163 A * | 1/1967 | Landon ................ 210/331 |
| 5,176,837 A * | 1/1993 | Dietrick ............... 210/767 |
| 5,265,631 A * | 11/1993 | Goettl ................. 134/111 |
| 5,750,022 A * | 5/1998 | Blake et al. ........... 210/167.12 |
| 5,759,414 A | 6/1998 | Wiles et al. |
| 5,785,846 A * | 7/1998 | Barnes et al. .......... 210/167.12 |
| 6,230,337 B1 | 5/2001 | Barnett |
| 6,269,493 B2 | 8/2001 | Sorensen |
| 6,393,631 B2 | 5/2002 | Schroader |
| 6,397,408 B1 | 6/2002 | Veloskey et al. |
| 6,419,840 B1 * | 7/2002 | Meincke ............... 210/767 |
| 6,615,417 B1 | 9/2003 | Newhard |
| 6,738,994 B2 | 5/2004 | Barnett et al. |
| 6,957,742 B1 * | 10/2005 | Pillart ................ 210/436 |
| 2001/0003217 A1 | 6/2001 | Sorensen |
| 2001/0042266 A1 | 11/2001 | Schroader |
| 2003/0208839 A1 | 11/2003 | Barnett et al. |
| 2004/0093666 A1 | 5/2004 | Zars |

OTHER PUBLICATIONS

American National Standards Institute; American National Standard for Residential Inground Swimming Pools; Apr. 25, 1995; Section 9.12 Return Inlets and Suction Outlets on p. 14 and 1.

(Continued)

*Primary Examiner*—Fred Prince
(74) *Attorney, Agent, or Firm*—Michael A. Mann; Nexsen Pruet, LLC

(57) ABSTRACT

A canister filter for use with a swimming pool water circulation and filtration system includes a lower manifold with two pump fittings so that two pumps may be connected to one filtration canister. The canister also has an upper manifold with two fittings for connections to different main drains, an equilizer port fitting, and a relief port fitting. The canister housing may optionally contain a venturi tube that can be used to augment the suction of a single pump to allow the elimination of a second pump, or, alternatively, allow additional main drains to be added to the pool without increasing the number of pumps. The single canister filter can thus be used with two pumps and drains or two sets of drains, while providing relief in the event the drains are blocked.

12 Claims, 8 Drawing Sheets

OTHER PUBLICATIONS

American National Standards Institute; Standard for Public Swimming Pools; Feb. 18, 1991; Section IX—Return Inlets and Suction Outlets on p. 18 and 19.

American National Standards Institute; Standard for Permanently Installed Residential Spas; Aug. 6, 1992; Section IX—Return Inlets and Suction Outlets on p. 8 & 9.

* cited by examiner

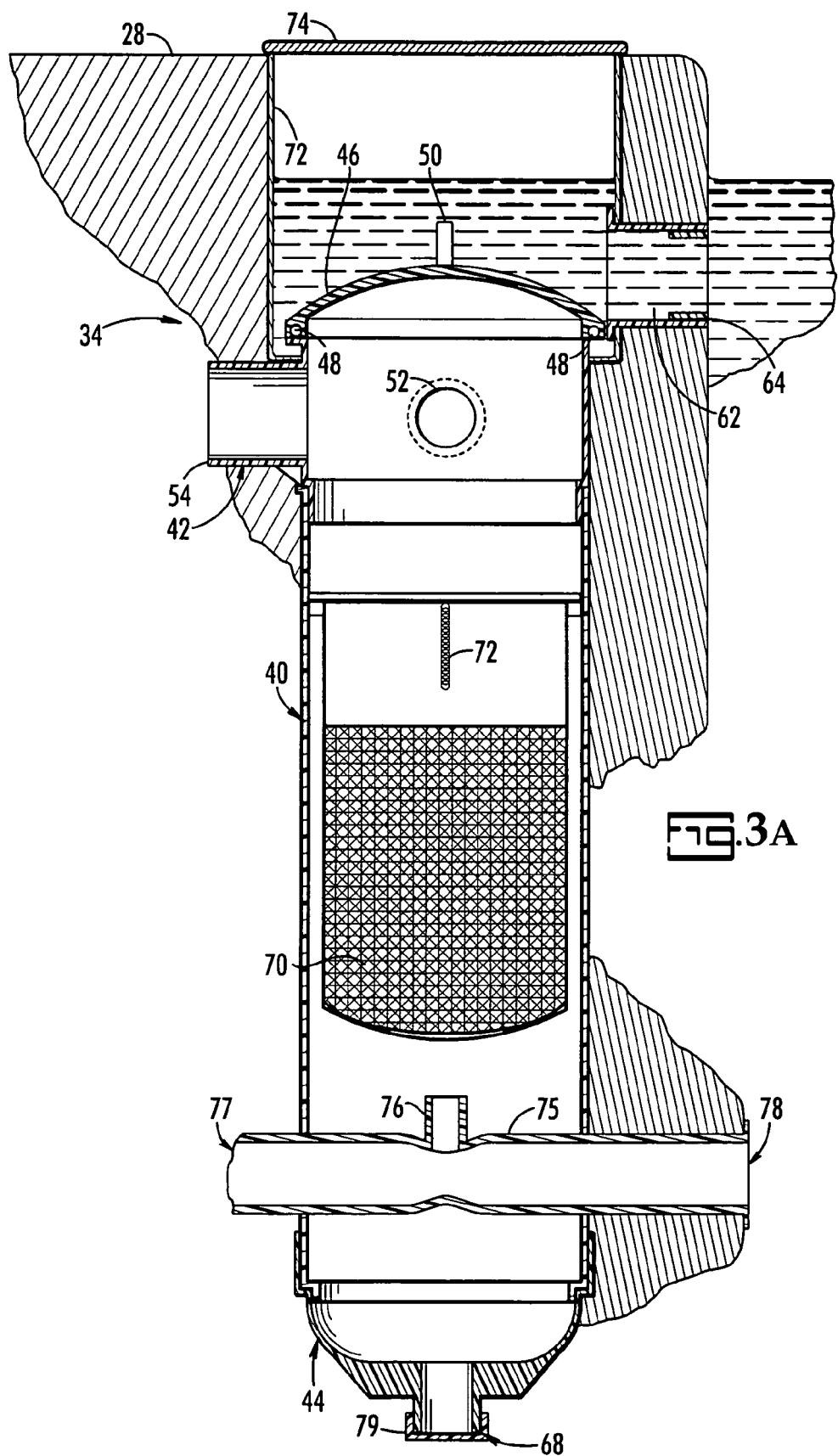

CANISTER FILTER FOR SWIMMING POOL

CROSS-REFERENCE TO RELATED APPLICATIONS

Not applicable

BACKGROUND OF THE INVENTION

The present invention relates to swimming pool filtration generally and to canister filters in particular.

The technology for maintaining the clarity and cleanliness of swimming pool water has developed significantly over the past 50 years. Currently, most new pools have at least three filters. There is a first filter for removing fine, suspended particulate such as dust and bacteria. This filter may is typically a tank containing sand or diatomaceous earth. There is a second filter for capturing floating debris, such as leaves and twigs. This second filter is often referred to as a skimmer because it is located along the side of the pool where it skims this floating debris to readily separate it from the water using a coarse mesh basket.

Typically, swimming pools also have a third filter, called a canister filter, for capturing sediment and heavier debris, such as water-logged leaves, from the bottom of the pool. This filter is positioned in line between the main drains of the pool, commonly located near the lowest point in the pool, and the suction side of the pump that delivers the pool water to the first filter.

The canister filter contains a strainer or fine-mesh, bag-like sieve to trap sediment and thus allow its removal periodically by the pool caretaker.

As the number of residential pools has increased, so, too, has the design of residential pools evolved to become larger and more customized. The residential owner demands that the pool require less maintenance and either be self-cleaning or have systems that make it easier to clean. Skimmers and suspended matter filters generally do a good job of removing floating and suspended debris and dirt. Sediment, however, requires more effort. Consequently, additional floor drains, pop-up cleaning jets built into the walls and floor of the pool, and robotic cleaners have been developed to facilitate the sweeping or vacuuming of sediment from the pool floor to the return lines. However, there remains a need for a better way to keep pools clean, and to manage sediment collection better.

SUMMARY OF THE INVENTION

Briefly recited and according to its major aspects, the present invention is a canister filter for a swimming pool that has dual pump fittings in its lower manifold and four fittings in its upper manifold. The four fittings of the upper manifold can accommodate multiple main drains, a relief port, and an equalizer line. A fine mesh filter bag collects sediment from the main drains regardless of which pump is operating.

The use of a two-pump fitting is an important feature of the present invention. While ordinarily doubling the capability of a component is not remarkable in and of itself, here, the additional fitting allows one canister to serve two pumps and their otherwise separate drains, for greater efficiency. Moreover, the single canister simplifies the tasks of the pool caretaker, which still involve the same periodic emptying of the mesh filter in the canister. Finally, the dual pump fitting of the canister simplifies the design of the pool because one canister filter can collect sediment from every drain.

Still another advantage of the present canister is the additional relief port. Entrapment is a serious concern to operators of swimming pools particularly when young children are to use those pools. The strong suction of main drains can trap a child and hold him fast, perhaps fatally so. Most swimming pools have systems designed to bypass the drains in the event they become blocked, perhaps by swimmer's body, thus releasing temporarily the hold on the swimmer and permitting the swimmer to get free of the drain. The present canister has an additional relief port in the event these other systems fail.

A feature of an alternative embodiment of the present canister uses the closing of one pump suction port, and the installation of a venturi tube in the body of the canister beneath the canister's mesh bag. The pump attached to the remaining suction port on the canister delivers a portion of its pressure side output water through the venturi tube thus increasing the suction inside the canister to satisfy the demand of multiple main drain locations with only a single pump.

Other features and their advantages will be apparent to those skilled in the art of swimming pool water circulation and filtration system design from a careful reading of the Detailed Description of Preferred Embodiments accompanied by the following drawings.

BRIEF DESCRIPTION OF THE DRAWINGS

In the drawings,

FIG. 3A is a cross sectional view of the canister of FIG. 2A taken along lines 3-3;

DETAILED DESCRIPTION OF PREFERRED EMBODIMENTS

The present invention is a canister filter for removing debris sucked from the floor of the swimming pool by a main drain. The present filter is connectable to main drains via piping and is preferably located so that the pool caretaker can easily access the present canister filter for periodic cleaning.

Figure 1:
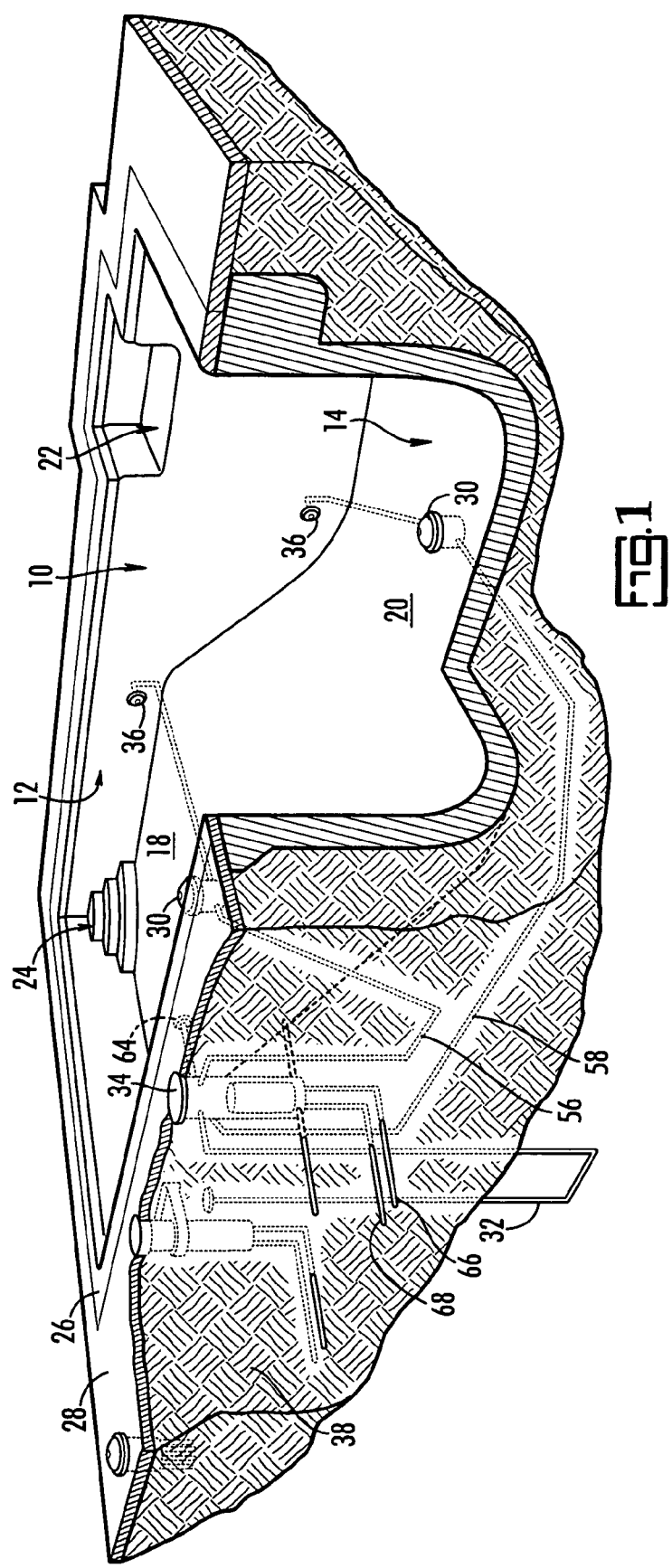
FIG. 1 is a perspective, partially cut away view of a swimming pool of the water circulation and filtration system of a swimming pool showing a canister according to a preferred embodiment of the present invention.

Referring now to FIG. 1, there is illustrated a perspective, partially cut away view of a swimming pool, generally indicated by reference number 10, that includes a wall 12 and floor 14 that together define a bowl that can be filled with water. Wall 12 and floor 14 may be made of a variety of materials including ceramic materials. Swimming pool 10 has a shallow end 18 and a deep end 20 and may have other features, such as a seat 22 and steps 24. Swimming pool 10 may be finished with a tile edge 26 and concrete 28.

In use, the water in swimming pool 10 requires care to keep it suitable for swimming. Part of the care is to remove suspended particulate; another part is to adjust the acidity so that bacteria do not multiply. Floating debris can be removed by the use of a skimmer. Sediment, such as sand and dirt, and other debris that is heavier than water, such as waterlogged leaves, will sink to floor 14 and gradually migrate to main drains 30, perhaps aided in its migration by other systems in the pool's water circulation system depending on pool design.

Newer, larger pools often have more than one main drain 30, particularly pools with irregular shapes. Main drains 30 are connected via piping to the water circulation system of swimming pool 10 via canister 34. Main drains 30 are also typically connected to relief ports 36 mounted in wall 12 of swimming pool 10. Piping connecting main drains 30 and canister 34 will be installed outside of pool 10 and the area around pool 10 backfilled with earth 38.

Figure 2:
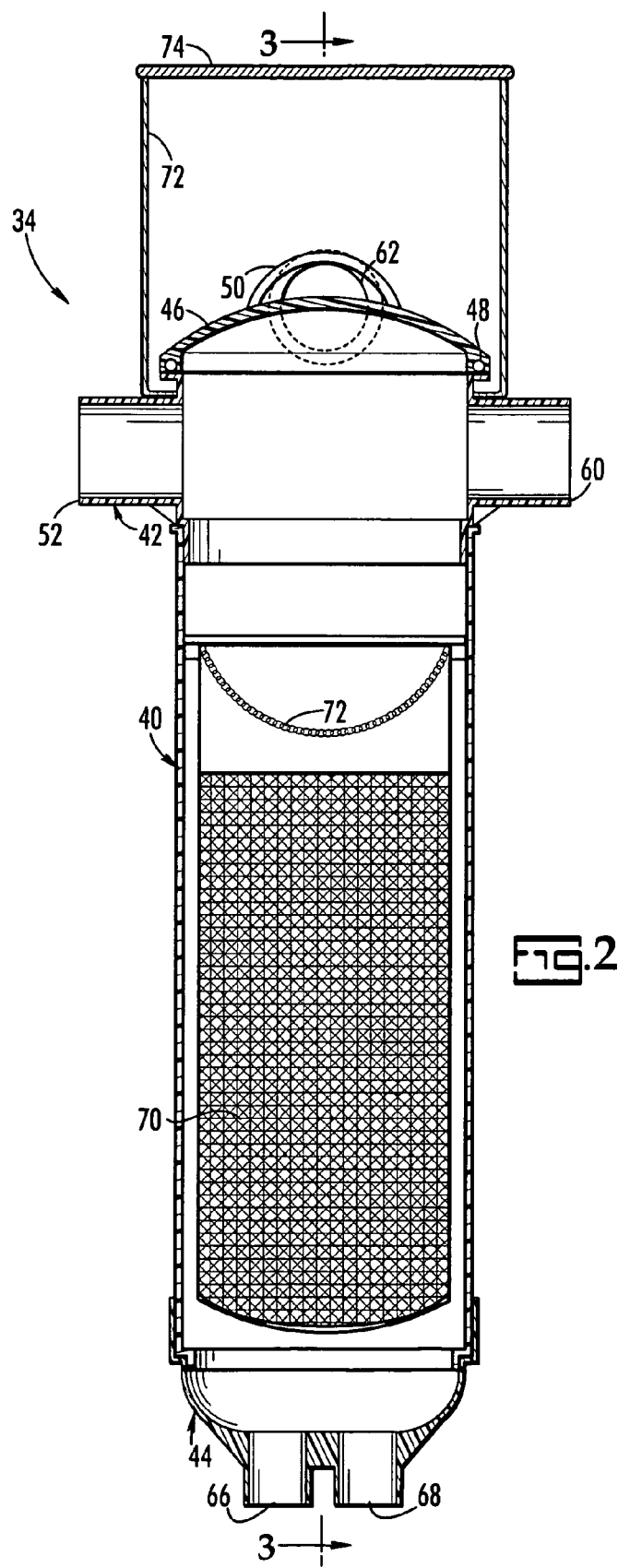
FIG. 2 is a cross sectional view of a canister according to a preferred embodiment of the present invention.
Figure 2A:
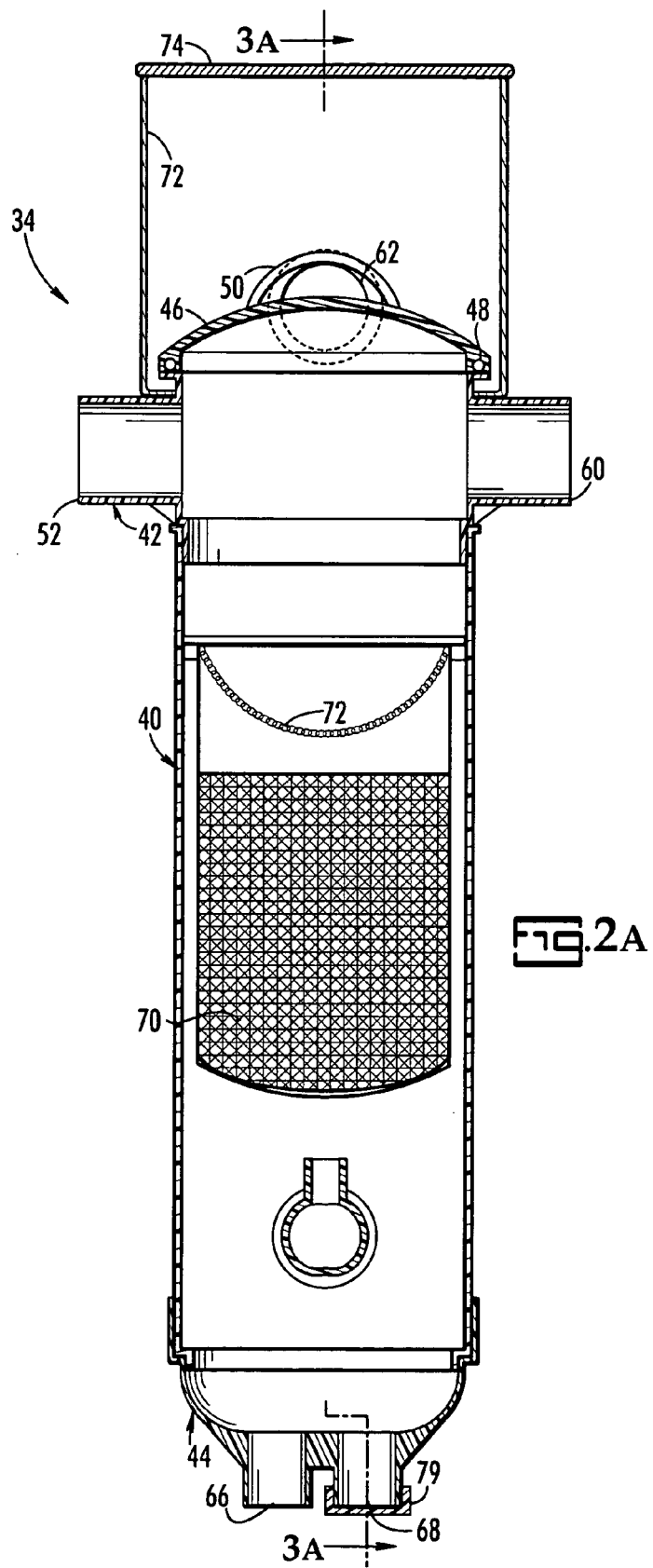
FIG. 2A is a cross sectional view of a canister according to an alternative preferred embodiment of the present invention.
Figure 3:
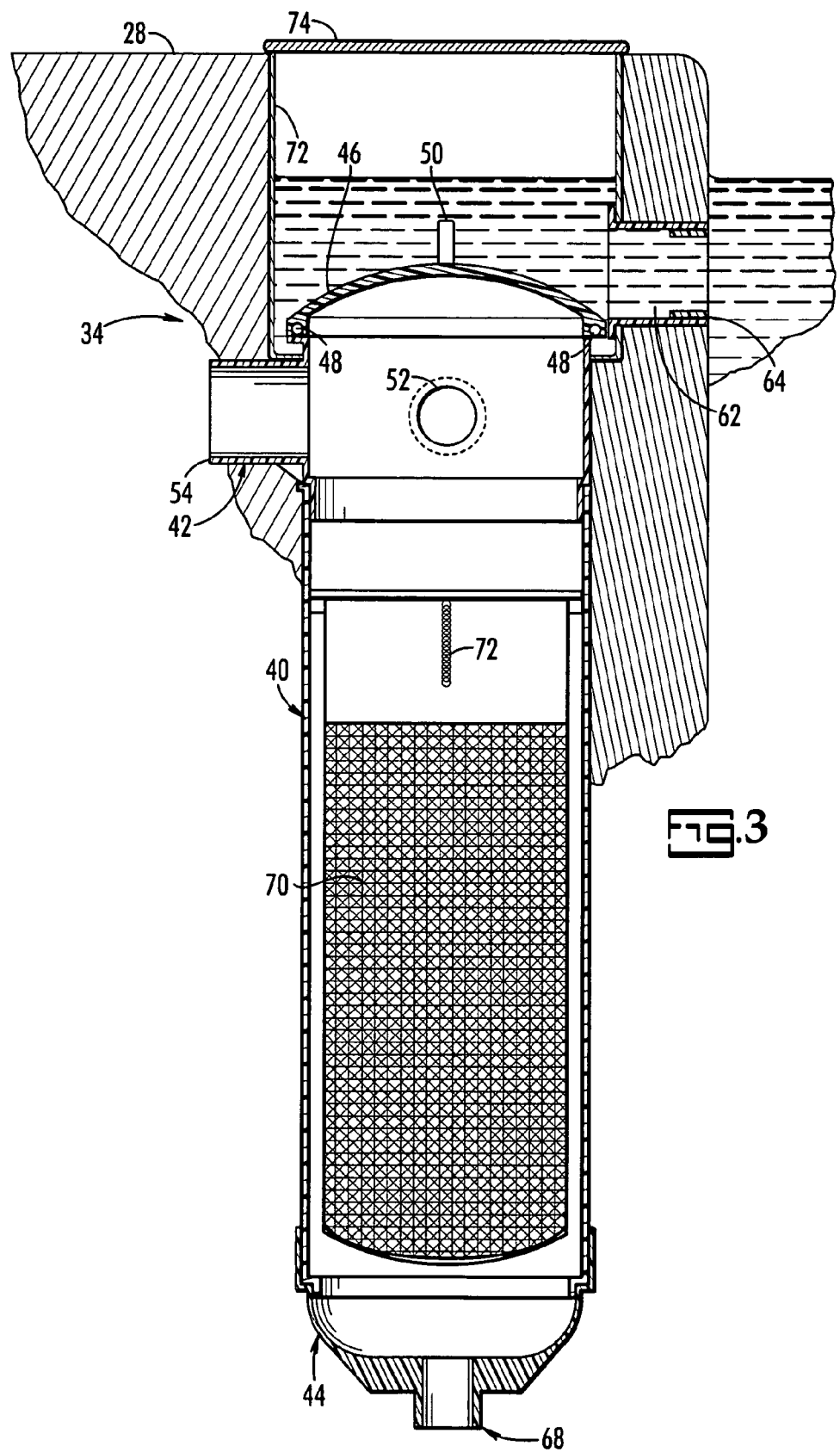
FIG. 3 is a cross sectional view of the canister of FIG. 2 taken along lines 3-3.

Referring now to FIGS. 2 and 3, canister 34 is illustrated in detail. FIG. 3 is a side view of canister 34 rotated 90° clockwise (when viewed from the top) from that shown in FIG. 2. Canister 34 includes a housing 40 that is preferably a right cylinder. An upper manifold 42 is attached to the top of housing 40; a lower manifold 44 is attached to the bottom of housing 40. The term manifold is used in its dictionary sense to indicate a pipe fitting with several lateral outlets for connecting it with other pipes. Upper manifold 42 has a lid 46 with a gasket 48 and a handle 50 and four fittings. Two of the four fittings, a first drain fitting 52 and a second drain fitting 54, are for connections to main drains. First drain fitting 52 and second drain fitting 54 each lead to a separate main drain 30 (or to more than one main drain each) in swimming pool 10 via lines 56 and 58 respectively (see FIG. 1). The term "lines" will be used synonymously with the term "piping" to indicate a cylindrical conduit with a much larger linear dimension compared to its diameter.

A third fitting 60 leads via relief line 32 to a relief port (not shown) in wall 12 to provide additional relief in the event main drains 30 become blocked. A fourth fitting 62 is connected to an equalizer line 64 admits water from pool 10 into a plenum 72 above upper manifold 42 so that if gasket 48 leaks, water, admitted through line 64 via equalizer fitting 62, will flow into upper manifold 42 thus preventing air from entering the water circulation system.

The term "fitting" means that upper manifold 42 is formed to have surface features that allow it to be coupled to piping easily, such as being in the shape of cylindrically flanged ports having internal diameters just larger than the outside diameters of piping (or just smaller than the inside diameters of piping) so that the piping can be slid into (or over) the cylindrical flanges and the two affixed together. When connected to piping, the interior of upper manifold 42 communicates with the interior of the piping 32, 56, 58 and 64 via fittings 60, 52, 54, and 62, respectively. Upper manifold 42 and piping are preferably made of polyvinyl chloride (PVC), so that they can be affixed by gluing, and are selected from the standard sizes of PVC available and the water circulation design of swimming pool. Piping connections other than glued connections, such as threaded connections, are also possible.

Figure 4:
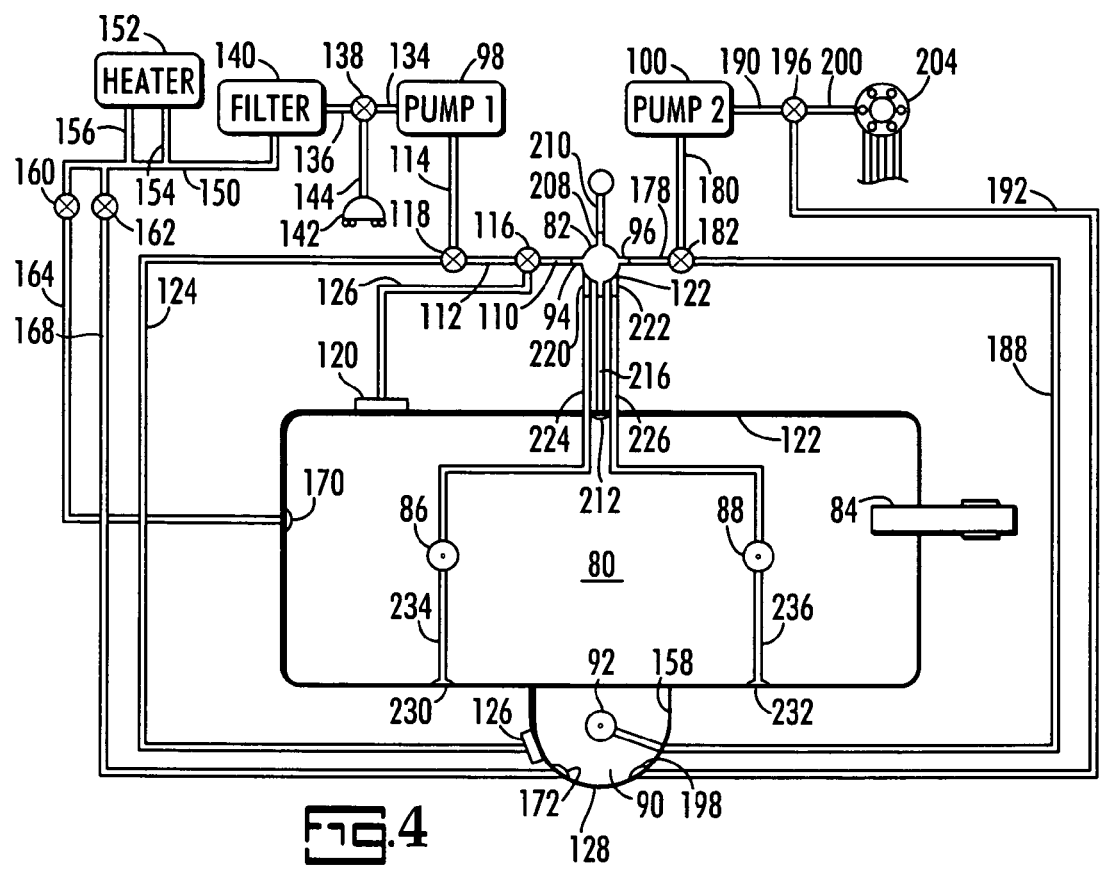
FIG. 4 is a schematic diagram of a swimming pool illustrating one way the present filter canister can be used in the design of a swimming pool water circulation and filtration system.

Lower manifold 44 has two fittings, a first fitting 66 for connection to a first pump 98 (in FIG. 4) and a second fitting 68 for connection to a second pump (in FIG. 4). The term "fitting" is used in the same manner here as the term "fitting" is used in connection with upper manifold 42.

Inside housing 40 is a mesh bag filter 70 that is bag-like in shape and made of a synthetic or man-made fabric mesh fine enough to trap sediment such as dirt and sand. Mesh bag filter 70 has a handle 72, such as a chain as shown, for use by a swimming pool caretaker to remove mesh bag filter 70 from housing 40 for occasional cleaning.

Above upper manifold 44 is plenum 72, also preferably cylindrical in shape, to provide access to upper manifold 42 and to mesh bag filter 70 through lid 46. Plenum has a lid 74 that is flush with concrete surrounds 28 when canister 34 is installed with respect to pool 10 so that the water surface in swimming pool 10 is at the same level as in plenum 72. Equalizer line 64 from fourth fitting 62 assures that pool water covers lid 46. In the event gasket 48 leaks, water will enter upper manifold 42 rather than air.

It will be appreciated by those skilled in the art of swimming pool water circulation and filtration design that canister 34 provides considerable design advantages because of the number of fittings it has, particularly the number and type of pump fittings. Because two separate pumps can be connected to first and second pump fittings 66, 68, of lower manifold 44, one canister 34 can be used for collecting debris from a large number of drains and other sources. Furthermore, third fitting 60 provides additional entrapment relief to main drains 30. Because of the importance of avoiding entrapment, however caused, this additional relief is provided and is physically independent of the relief ports 36.

As an optional feature, housing 40 can be modified to include a venturi tube 75 with a vent 76 to the interior of housing 40, an inlet port 77 and an outlet port 78. Inlet port 77 comes from a pump return; outlet port 78 returns to the pool, preferably to wall jets. The pump return water, flowing through venturi tube 75, draws water into vent port, thereby increasing the suction through canister 34. If one pump is available, second pump fitting 68 can be capped using a cap 79. The one pump drawing on canister 34 directly through remaining first pump fitting 66 and having its suction augmented by the use of venturi tube 75, can provide adequate suction for two separate main drains. Alternatively, if two pumps are drawing from ports 66 and 68 and one pump is returning flow through venturi 75, canister 34 can service additional main drains.

Moreover, in the event all main drains were blocked, the pump connected to first pump fitting 66 would cause the flow to outlet port 78 to cease, and water from the pool would be sucked into vent 76 into housing and back into the pool through outlet port 78, thus further providing entrapment relief at the main drains.

Referring now to FIG. 4, there is illustrated an example of a swimming pool 80 employing a canister 82 according to a preferred embodiment of the present invention. Swimming pool 80 may have a diving board 84 at one end and two main drains 86, 88 in the deepest part of swimming pool 80. A spa 90 is adjacent swimming pool 80 and has its own main drain 92.

Central to the operation of swimming pool 80 and spa 90 is canister 82. Canister 82 has six fittings including two pump fittings, two drain fittings, a relief fitting and an equalizer fitting that are all connected to piping leading to other components of the system, as will be described.

Canister 82 has a first and second pump fitting, 94, 96, that lead to the suction sides of a first pump 98 and a second pump 100, via lines 110 and 178, respectively. First pump fitting 94 is connected to first pump 98 via lines 110, 112, and 114 and valves 116 and 118. Valve 116 permits connection of a skimmer 120 mounted in the wall 122 of pool 80 to pump 98. Valve 118 permits connection of a line 124 to a skimmer 126 mounted in the wall 128 of spa 90 to pump 98. Skimmers 120, 126, allow floating debris to be removed from pool 80 and spa 90, respectively.

The pressure side of pump 98 is connected via lines 134 and 136 and valve 138 to a filter 140 suitable for removal of suspended particulate. Valve 138 also permits the optional use of a robotic pool cleaner 142 on the end of a flexible hose connected to line 144 connected to valve 138.

On the output side of filter 140 is a line 150 that allows a diversion of a portion of the return water through heater 152 via input line 154 and output line 156 before returning the cleaned, heated water via valves 160, 162 in lines 164, 168 to return port 170 in wall 122 of pool 80 and jets 172 in wall 128 of spa 90.

Second pump fitting 96 is connected via lines 178 and 180 through valve 182 to second pump 100. Valve 182 also controls flow from a main drain 92 in spa 90 via lines 188 and 180 to the suction side of second pump 100.

On the pressure side of second pump 100 lines 190 and 192 through valve 196 lead to additional spa jets 198 or, through line 200, to a six port hydraulic valve 204. Hydraulic valve 204 is connected to six banks of water jets (not shown) located on wall 122 of pool in six zones. These jets are used for driving sediment to drains 86 and 88 in accordance with the teachings of U.S. Pat. No. 6,419,840, incorporated herein by reference.

Canister 82 also has an equilizer fitting 208 leading to an equilizer line 210 and a relief fitting 214 leading to a relief port 212 via a relief line 216 mounted in wall 122 of pool 80.

Canister 82 has two more fittings: a first drain fitting 220 and a second drain fitting 222 that are connected via lines 224, 226, to main drains 86, 88, respectively. Main drains 86, 88, are also connected to relief ports 230, 232, via relief lines 234, 236.

In this example configuration, it will be clear that canister 82 can receive sediment from main drains 86, 88 of pool 80 and main drain 186 in spa 90 through various lines in which suction is provided by pumps 98 and 100, as described. The pool caretaker need only periodically empty the accumulated dirt and sand from its mesh filter. In operation, it provides additional entrapment relief.

Figure 5:
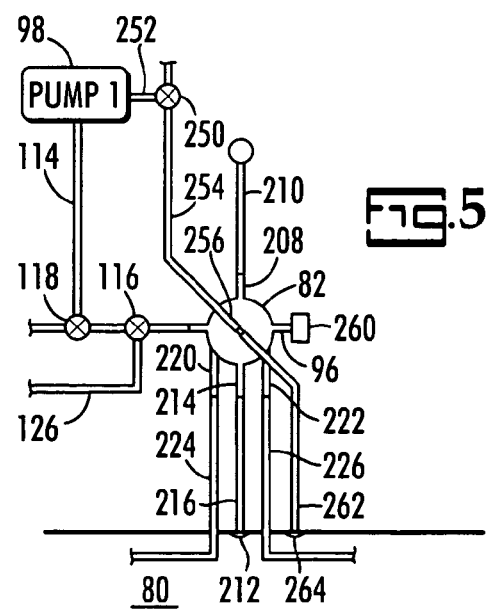
FIG. 5 is a detail of the schematic of FIG. 4 showing the piping altered to include the venturi tube in the canister.

FIG. 5 shows a detail of FIG. 4, modified to include the venturi and its connections to pump 98. Pressure side of pump 98 is connected to a valve 250 via pipe 252 and thence to canister 82 via a pipe 254. Venturi 256 runs across the inside of canister 82 and, when the output of pump 98 is flowing, will produce suction inside canister 82 to augment that of pump 98. Second pump fitting is not connected to second pump 100 but is instead capped off with a cap 260. The output of venturi flows via a pipe 262 to pool 80 where it terminates in a fitting 264. Thus, by the use of venturi tube 256 and the output of pump 98, the need for second pump 100 can be obviated; venturi 256 can augment the suction provided by pump 98 sufficiently to meet the suction demand of multiple main drains.

FIGS. 6A through 6D illustrate four different configurations of water circulation systems for swimming pools. Each one features the present canister in combination with other components. Some components that are commonly part of a water circulation system are not shown on each drawing but have been eliminated for the simplicity of the drawings and to focus on the relationship of the canister with other components. Also, it will be clear that other configurations can be created by those skilled in the art of swimming pool water circulation systems from the teachings of these four illustrations.

Figure 6A:
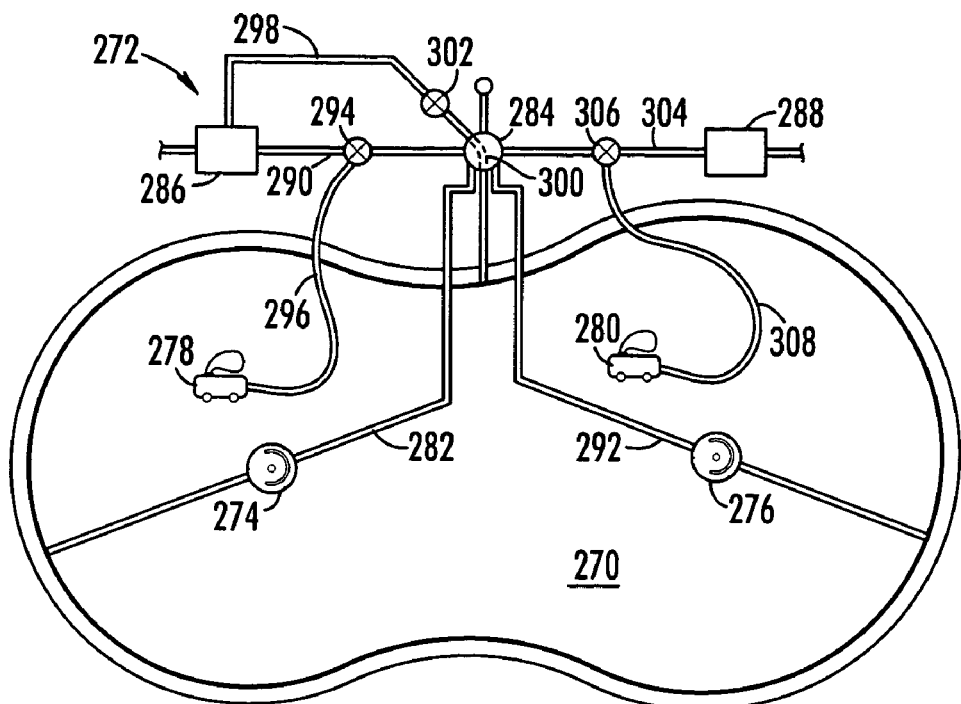
FIGS. 6A-6D illustrate four alternative water circulation systems for swimming pools using the present invention.

FIG. 6A illustrates a swimming pool 270 with a water circulation system 272 that helps to maintain the clarity of the water in pool 270 by removing sediment using two main drains 274, 276, and two robotic cleaners 278, 280. Each robotic cleaner 278, 280, operates in a different zone of swimming pool 270 so that they do not become entangled.

A single canister 284 according to the present invention receives sediment from drains 274, 276, and is connected to a first pump 286 and a second pump 288. First pump 286 sucks water and sediment from drains 274, 276, via lines 282, 292, respectively, through a mesh (best seen in FIG. 3) in canister 284 and passes it through a suction side line 290. A valve 294 in suction side line 290 allows robotic cleaner 278 to function as a suction side robot when suction from first pump 286 sucks water and sediment through robotic hose 296.

A pressure side line 298 on the pressure side of first pump 286 directs a flow of water under pressure through a venturi 300 in canister 284 when a venturi valve 302 is opened to augment suction of canister 284. Typically, venturi valve 302 is opened when robotic cleaners 278, 280, are in operation and closed when they are not.

Second pump 288 also sucks water and sediment from drains 274, 276, through canister 284 and a suction side line 304. Robotic cleaner 280 is activated by opening a valve 306 to provide suction through a robot hose 308.

Figure 6B:
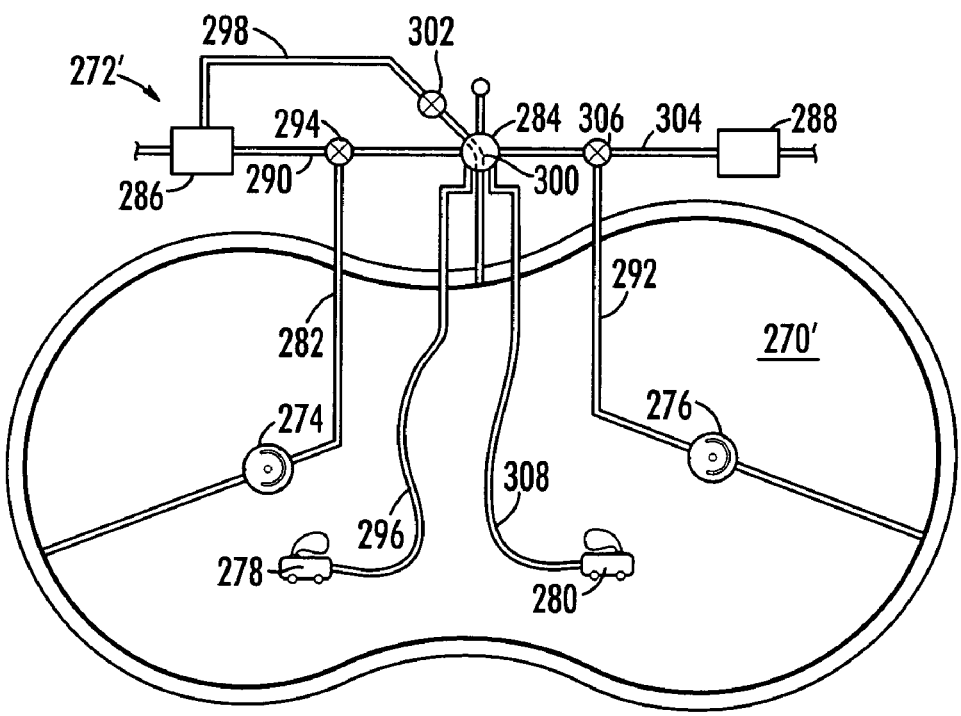

FIG. 6B, in which the same reference numbers are used as in FIG. 6A, illustrates a pool 270' with a water circulation system 272' that has the same components as that shown in FIG. 6A except that drains 274, 276, are connected to valves 294, 306, respectively, and robotic cleaners 278, 280, are connected to canister 284. The operation of water circulation system 272 and 272' are essentially the same except that the filter mesh bag in canister 284 in system 272' is not being used to removed sediment sucked up by main drain 274, 276. Robotic cleaners may have their own filter mesh bags. Canister 284 does, however, serve as a central connection point for various components and as a way to augment suction to those components connected to it using venturi 300.

Figure 6C:
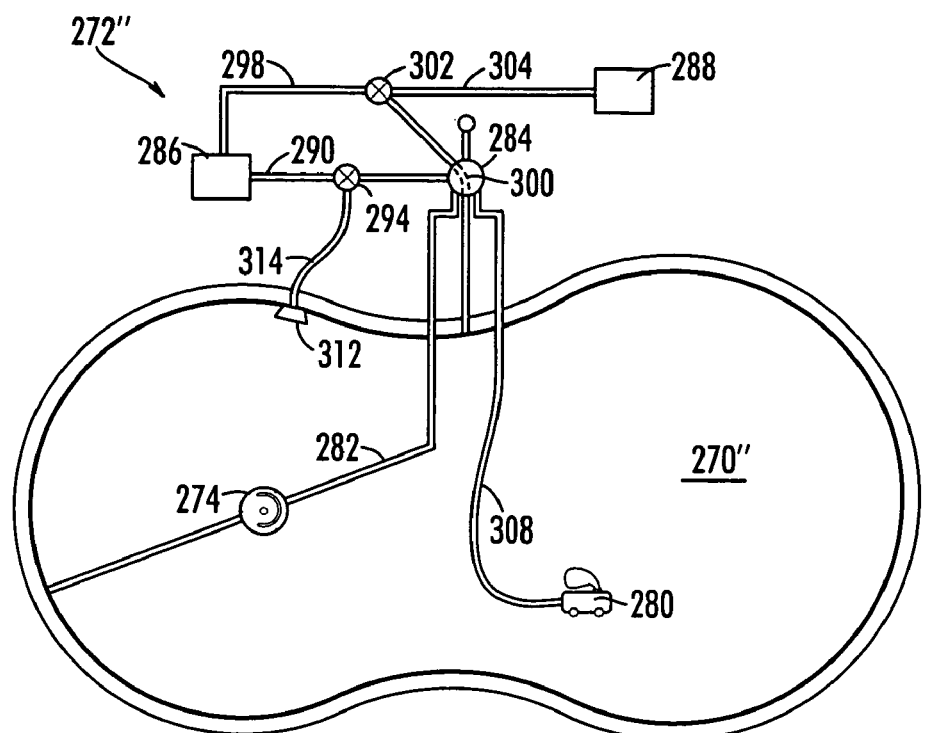

FIG. 6C illustrates yet another swimming pool 270" with yet another water circulation system 272". In the water circulation system 272" of FIG. 6C, there is only drain 274 connected to canister 284 via line 282 and one robotic cleaner 280 connected to canister 284 via line 308. A skimmer 312 is connected to valve 294 via line 314. In swimming pool 270", skimmer 312 removes floating debris and drain 274 removes sediment in its vicinity, presumably the lowest point in pool 270". Robotic cleaner 280 removes additional sediment that does not drift toward drain 274. Valve 302, in this configuration, not only activates venturi 300 from first pump 286, but may also activate venturi 300 from second pump 288. Second pump 288 may operate a hydraulic valve such as is illustrated in FIG. 4 that operates jet nozzles located in the wall of swimming pool 270" or other components.

Figure 6D:
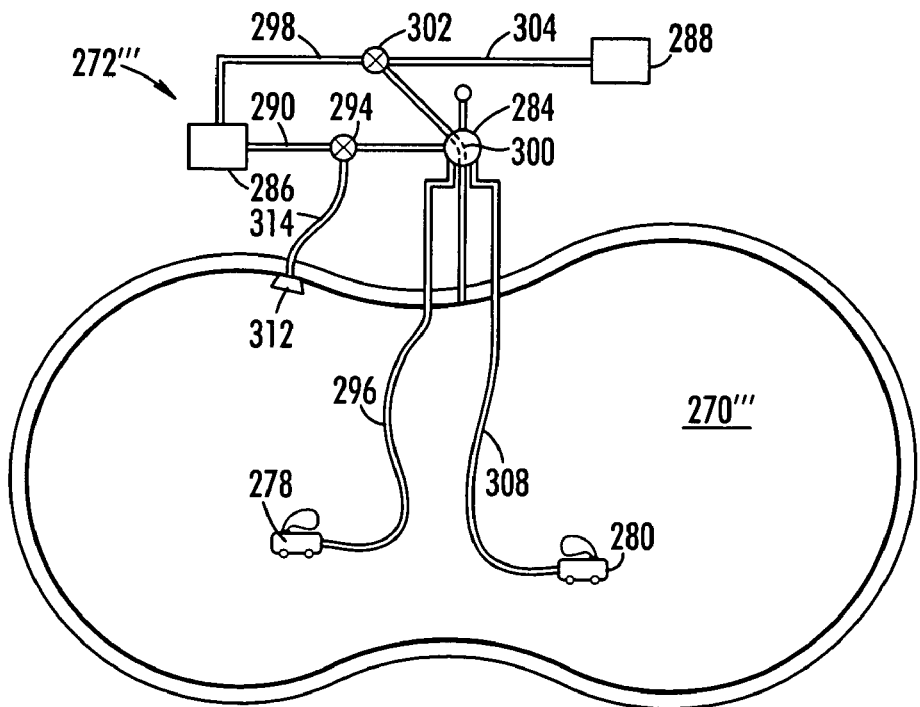

FIG. 6D illustrates a variation of a water circulation system 272" and of pool 270", this one showing a swimming pool 270''' having in its water circulation system 272''' no drains but two robotic cleaners 278, 280, both connected to canister 284 via lines 296, 308.

In FIGS. 6A-6D, canister 284 serves as a single component to which many others can be connected and which can be used for augmenting suction as well as removal of sediment. Canister 284 gives more flexibility in connecting pool components and making those that are available work better, in addition to its primary role of removing sediments from the pool floor.

It will be readily apparent to those skilled in the art of swimming pool water circulation and filtration design that many changes and substitutions can be made to the foregoing preferred embodiments without departing from the spirit and scope of the present invention, defined by the appended claims.

What is claimed is:

1. A canister for use in filtering sediment from a swimming pool, said canister comprising:
   a housing having a top and a bottom;
   an upper manifold carried by said top of said housing, said upper manifold having a first drain fitting formed therein and a relief port fitting formed therein;
   a lower manifold carried by said bottom of said housing, said lower manifold having a first pump fitting and a second pump fitting; and
   a mesh bag filter carried within said housing between said upper manifold and said lower manifold so that, when said first drain fitting is connected to a source of water and said first and said second pump fittings are each connected to a pump, said pump can pump said water from said source into said first drain fitting, through said mesh bag filter and out of said first and said second pump fittings, and said mesh bag filter can filter debris from said water.

2. The canister as recited in claim 1, wherein said upper manifold has a second drain fitting formed therein.

3. The canister as recited in claim 1, wherein said upper manifold has an equilizer port fitting formed therein.

4. The canister as recited in claim 1, further comprising a venturi carried within said housing, said venturi having an inlet, an opposing outlet and a vent, said vent providing additional suction inside said housing when a fluid flows between said inlet and said outlet.

5. The canister as recited in claim 4, wherein said venturi is located below said mesh bag filter.

6. The canister as recited in claim 4 wherein said inlet of said venturi is connected to the output of said pump.

7. The canister as recited in claim 1, further comprising an end cap dimensioned to fit on and close said second pump fitting.

8. A canister for use in filtering sediment from a swimming pool, said canister comprising:
   a housing having a top and a bottom;
   an upper manifold carried by said top of said housing, said upper manifold having a first drain fitting, a second drain fitting, and a relief port fitting formed therein;
   a lower manifold carried by said bottom of said housing, said lower manifold having a first pump fitting and a second pump fitting; and
   a mesh bag filter carried within said housing between said upper manifold and said lower manifold so that, when said first drain fitting is connected to a source of water and said first and said second pump fittings are each connected to a pump, said pump can pump said water from said source into said first drain fitting, through said mesh bag filter and out of said first or said second pump fittings, and said mesh bag filter can filter debris from said water.

9. The canister as recited in claim 8, wherein said upper manifold has an equilizer port fitting formed therein.

10. The canister as recited in claim 8, further comprising a plenum carried by said upper manifold for permitting access to said mesh bag filter.

11. A canister for use in filtering sediment from a swimming pool, said canister comprising:
    a housing having a top and a bottom and an interior;
    an upper manifold carried by said top of said housing, said upper manifold having a drain fitting formed therein;
    a lower manifold carried by said bottom of said housing, said lower manifold having a pump fitting;
    a mesh bag filter carried within said housing between said upper manifold and said lower manifold so that, when said drain fitting is connected to a source of water and said pump fitting is connected to a pump, said pump can pump said water from said source into said drain fitting, through said mesh bag filter and out of said pump fitting, and said mesh bag filter can filter debris from said water as said water passes through said interior of said housing; and
    a venturi carried within said housing, said venturi having an inlet, an opposing outlet and a vent to said interior of said housing, said venturi providing additional suction to said interior of said housing when a fluid flows between said inlet and said outlet.

12. A water circulation system for use with a swimming pool, said canister comprising:
    a main drain;
    a pump having a pressure side and a suction side;
    a canister in fluid communication with said pump and said main drain, said canister including
      a housing having a top and a bottom and in interior,
      an upper manifold carried by said top of said housing, said upper manifold having a drain fitting formed therein and connected to said main drain,
      a lower manifold carried by said bottom of said housing, said lower manifold having a pump fitting connected to said suction side of said pump,
      a venturi carried within said housing, said venturi having an inlet, an opposing outlet and a vent, said vent providing additional suction inside said housing when a fluid flows between said inlet and said outlet, and
      a mesh bag filter carried within said housing between said upper manifold and said lower manifold so that said pump can pump said water from said main drain into said drain fitting, through said mesh bag filter and out of said pump fitting to said suction side of said pump, said mesh bag filtering debris from said water as said water passes within said interior of said housing, and said pump can pump water from said pressure side of said pump through said inlet of said venturi to said outlet of said venturi, thereby increasing suction inside said housing via said vent.

* * * * *